United States Patent
Marc

(10) Patent No.: US 8,236,212 B2
(45) Date of Patent: *Aug. 7, 2012

(54) METHOD OF FORMING A HARDENED SKIN ON A SURFACE OF A MOLDED ARTICLE

(75) Inventor: Michel Marc, Lenexa, KS (US)

(73) Assignee: Vertex L.L.C., Lenexa, KS (US)

( * ) Notice: Subject to any disclaimer, the term of this patent is extended or adjusted under 35 U.S.C. 154(b) by 264 days.

This patent is subject to a terminal disclaimer.

(21) Appl. No.: 12/577,255

(22) Filed: Oct. 12, 2009

(65) Prior Publication Data

US 2010/0096780 A1    Apr. 22, 2010

Related U.S. Application Data

(63) Continuation-in-part of application No. 10/890,906, filed on Jul. 14, 2004, now Pat. No. 7,837,910.

(51) Int. Cl.
*B29C 44/06* (2006.01)
*B29C 44/00* (2006.01)
*H05B 7/06* (2006.01)

(52) U.S. Cl. .......... 264/45.5; 264/54; 264/419

(58) Field of Classification Search .......... None
See application file for complete search history.

(56) References Cited

U.S. PATENT DOCUMENTS

| | | | | |
|---|---|---|---|---|
| 3,345,439 A | * | 10/1967 | Everard et al. | 264/421 |
| 3,803,274 A | * | 4/1974 | Nakashima et al. | 264/420 |
| 4,268,238 A | * | 5/1981 | Marc | 425/174.8 E |
| 4,296,053 A | * | 10/1981 | Doerer et al. | 264/421 |
| 4,441,876 A | * | 4/1984 | Marc | 425/174.8 E |
| 4,459,249 A | * | 7/1984 | Matsuda | 264/419 |
| 4,524,037 A | * | 6/1985 | Marc | 264/413 |
| 4,525,231 A | * | 6/1985 | Wnuk | 156/185 |
| 4,783,287 A | * | 11/1988 | Eichberger et al. | 264/421 |
| 4,824,617 A | * | 4/1989 | Takeuchi et al. | 264/419 |
| 4,851,167 A | * | 7/1989 | Marc | 264/421 |
| 4,921,647 A | * | 5/1990 | Stewart | 264/490 |
| 5,509,795 A | * | 4/1996 | Near et al. | 425/4 C |
| 6,299,807 B1 | * | 10/2001 | Kimura et al. | 264/45.5 |
| 6,616,886 B2 | * | 9/2003 | Peterson et al. | 264/415 |
| 2006/0012083 A1 | * | 1/2006 | Marc | 264/449 |

FOREIGN PATENT DOCUMENTS

| | | | |
|---|---|---|---|
| EP | 1053849 | * | 11/2000 |
| FR | 2129967 | * | 11/1972 |

* cited by examiner

*Primary Examiner* — Edmund H. Lee
(74) *Attorney, Agent, or Firm* — Stinson Morrison Hecker LLP

(57) ABSTRACT

A method of forming a hardened skin on one or more surfaces of a molded article. In an exemplary method, a formable material is mixed with a blowing agent to form a foam material. The foam material is placed in a flow molding apparatus such that a first surface of the foam material is in contact with a first mold section and a second surface of the foam material is in contact with a second mold section. In operation, an alternating dielectric field is applied across the foam material to form the molded article. At the end of the molding cycle, the first and/or second surfaces of the foam material remain under the decomposition temperature of the blowing agent and are not blown so as to form one or more thicknesses of hardened skin on the molded article.

13 Claims, 4 Drawing Sheets

METHOD OF FORMING A HARDENED SKIN ON A SURFACE OF A MOLDED ARTICLE

CROSS-REFERENCE TO RELATED APPLICATIONS

This application is a continuation-in-part of, and claims priority to, U.S. patent application Ser. No. 10/890,906, filed on Jul. 14, 2004, now U.S. Pat. No. 7,837,910 which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention is generally directed to the field of flow molding, and is more specifically directed to a unique flow molding process for forming a hardened skin on one or more surfaces of a molded article.

2. Description of Related Art

Various flow molding apparatuses are known in the art that employ dielectric heating to mold a plastic part from a formable plastic material. In all of these apparatuses, the plastic material is placed between two electrodes such that the material effectively becomes the dielectric of a capacitor. An alternating electric field generated between the electrodes causes polar molecules in the plastic material to be attracted and repelled by the rapidly changing polarity of the electric field. The friction resulting from this molecular movement causes the plastic material to heat throughout its entire mass to thereby form the molded article.

One flow molding apparatus known in the art for making plastic parts comprises a top electrode and a bottom electrode with top and bottom molds disposed therebetween. The top and bottom molds define a molding cavity in which a plastic material may be placed. Preferably, the current field lines are perpendicular to the plastic material at all points along its surface to thereby provide a uniform temperature throughout the material. In addition, the top and bottom electrodes substantially match the configuration of the plastic part that is being fabricated such that the distance between the electrodes is constant in order to provide uniform heating of the plastic material. In operation, an alternating electric field is applied across the molding cavity to thereby form the plastic part. An example of this type of a flow molding apparatus is disclosed in U.S. Pat. No. 4,268,238.

Another flow molding apparatus known in the art for making plastic parts comprises a top electrode and a bottom electrode with a mold disposed therebetween. The mold has a non-uniform thickness so as to allow the molding of a non-uniform plastic part from a plastic material placed between the mold and the top electrode. In order to provide uniform heating throughout the plastic material, a constant capacitance is maintained throughout all of the different thickness sections of the plastic part. This may be accomplished by equalizing the relative dielectric constants between the plastic material and the mold, preferably by altering the relative dielectric constant of the mold via the use of additives. Alternatively, the capacitance may be equalized by modifying the spacing between the top and bottom electrodes in the different thickness sections of the plastic part. An example of this type of a flow molding apparatus is disclosed in U.S. Pat. No. 4,441,876.

Another flow molding apparatus known in the art for making foamed plastic parts comprises a top electrode and a bottom electrode with a mold disposed therebetween. A plastic foam material may be placed in a cavity of the mold and then compressed during the molding cycle. After the heat is terminated, the compressed plastic foam material is permitted to expand as it cools so as to conform to the shape of the mold and thereby form the foamed plastic part. An example of this type of a flow molding apparatus is disclosed in U.S. Pat. No. 4,524,037.

Yet another flow molding apparatus known in the art for making foamed plastic parts comprises a top electrode and a bottom electrode with a two-piece mold disposed therebetween. The mold supports a diaphragm such that a plastic foam material may be placed between the diaphragm and the bottom mold. A fluid is injected into the mold above the diaphragm so as to initially deflect the diaphragm and thus expel substantially all of the air from the mold. The fluid is then extracted from the mold during the molding cycle, which causes a vacuum in the mold to thereby assist in the expansion of the plastic foam material. An example of this type of an apparatus is disclosed in U.S. Pat. No. 4,851,167.

The flow molding apparatuses and related methods described above are suitable for the manufacture of many different types of plastic parts, including foamed plastic parts. Many of the foamed plastic parts made in accordance with these methods, however, are not sufficiently durable to withstand the abrasion that occurs during normal use of the parts, are not easily washable, cannot be texturized as desired, and/or do not include a non-skid surface as required for particular applications. Thus, there is a need in the art for a molding process that overcomes one or more of the problems associated with the methods for forming the foamed plastic parts described above.

BRIEF SUMMARY OF THE INVENTION

The present invention is directed to a method of forming a hardened skin on one or more surfaces of a molded article. In accordance with this method, a formable material is mixed with a blowing agent to form a foam material. The foam material is then placed in a flow molding apparatus whereby an alternating dielectric field is applied across the foam material to form the molded article. Typically, most of the foam material exceeds the decomposition temperature of the blowing agent and is fully blown at the end of the molding cycle. However, one or more surfaces of the foam material remain under the decomposition temperature of the blowing agent and are not blown so as to form one or more thicknesses of hardened skin on the molded article. The method of the present invention enables the fabrication of molded articles with hardened skins that are sufficiently durable to withstand the abrasion that occurs during normal use of the articles, are easily washable, may be texturized as desired, and/or include a non-skid surface as required for particular applications.

In a first exemplary embodiment, the foam material is placed in a flow molding apparatus such that the top surface of the foam material is in contact with a top mold of the apparatus and the bottom surface of the foam material is in contact with a bottom mold of the apparatus. The top mold is modified (e.g., by adjusting its power factor via the use of one or more suitable additives) so that its bottom surface reaches a temperature that is substantially the same as the molding temperature of the foam material at the end of the molding cycle. By matching the temperature of the top mold to the molding temperature of the foam material, the top surface of the foam material exceeds the decomposition temperature of the blowing agent and is fully blown at the end of the molding cycle. As such, a hardened skin is not formed on the top surface of the molded article.

In this embodiment, a bottom electrode of the flow molding apparatus is chilled so as to reduce the temperature of the bottom mold. By doing so, the bottom surface of the foam material remains under the decomposition temperature of the blowing agent and is not blown at the end of the molding cycle. As such, a hardened skin is formed on the entire bottom surface of the molded article. The thickness of the hardened skin is dependent on a variety of factors, including the thermal conductivity of the bottom mold, the power factor of the bottom mold, and the temperature of the bottom mold. One or more of these factors may be adjusted in order to increase or decrease the thickness of the hardened skin as desired for a particular type of molded article.

In a second exemplary embodiment, the foam material is placed in a flow molding apparatus such that the top surface of the foam material is in contact with a top mold of the apparatus and the bottom surface of the foam material is in contact with a bottom mold of the apparatus. The top mold is modified such that a hardened skin is not formed on the top surface of the molded article (as in the first exemplary embodiment). However, in this embodiment, the bottom mold includes different mold sections that are modified to form two different thicknesses of hardened skin on various bottom surfaces of the molded article. Specifically, a first thickness of hardened skin is formed on certain bottom surfaces of the molded article (i.e., the surfaces in contact with a first group of mold sections) and a second thickness of hardened skin is formed on other bottom surfaces of the molded article (i.e., the surfaces in contact with a second group of mold sections). As in the first exemplary embodiment, the thickness of each hardened skin is dependent on a variety of factors, including the thermal conductivity of the bottom mold section, the power factor of the bottom mold section, and the temperature of the bottom mold section. One or more of these factors may be adjusted in order to increase or decrease the thickness of each hardened skins as desired for a particular type of molded article.

In general, the method of the present invention may be used to make a molded article from a single foam material placed between the top and bottom molds of a flow molding apparatus. Alternatively, the method may be used to make a molded article from two or more different formable materials (at least one of which is a foam material) placed between the top and bottom molds of a flow molding apparatus. In either case, a hardened skin may be formed on one or more surfaces of the molded article as desired. Accordingly, the method may be used to make a variety of different types of molded articles in accordance with the present invention.

BRIEF DESCRIPTION OF THE DRAWINGS

The method of the present invention will be described in greater detail in the following detailed description of the invention with reference to the accompanying drawings that form a part hereof, in which.

DETAILED DESCRIPTION OF THE INVENTION

The present invention is directed to a method of forming a hardened skin on one or more surfaces of a molded article. In accordance with this method, a formable material is mixed with a blowing agent to form a foam material. The foam material is then placed between a top mold and a bottom mold of a flow molding apparatus whereby an alternating dielectric field is applied across the foam material to form the molded article. The temperature of certain mold sections are reduced so that one or more surfaces of the foam material will remain under the decomposition temperature of the blowing agent to thereby form a hardened skin on the molded article. One skilled in the art will understand that the method of the present invention may be used to manufacture a variety of different types of molded articles for use in a variety of different industries.

As used herein, the term "foam material" means any formable material mixed with one or more blowing agents that may be heated to form a defined shape within a mold of a flow molding apparatus. As is known in the art, many different types of formable materials (including thermoplastics and thermosets) and many different types of blowing agents may be used to form a foam material and will vary depending on the molded article to be fabricated. It may also be desirable to mix one or more cross-linkers with the foam material in order to provide greater material strength. Examples of suitable foam materials include cross-linked PE-EVA foam, PVC foam, vinyl nitrile foam, neoprene foam, foamed rubber, polypropylene, and blends of any of the foregoing. Of course, it should be understood that many other types of foam materials may also be used in accordance with the present invention.

It should be understood that each of the foregoing foam materials has a molding temperature and molding time associated therewith. As used herein, the term "molding temperature" means the temperature at which a foam material is blown and/or cross-linked (which may comprise any temperature above the decomposition temperature of the blowing agent in the foam material), and the term "molding time" means the amount of time required for a foam material to reach its molding temperature. It will be seen that any portion of a foam material that does not reach its molding temperature and remains under the decomposition temperature of the blowing agent will not be blown and, thus, will form a hardened skin on the surface of the molded article.

FIRST EXEMPLARY EMBODIMENT

Figure 1:
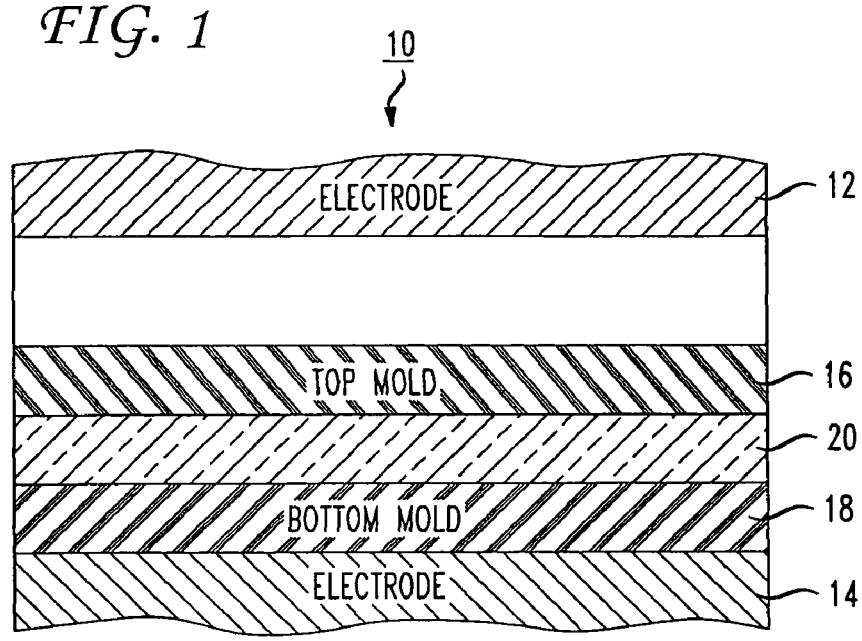
FIG. 1 is a diagram of a flow molding apparatus, wherein a foam material has been placed between a top mold and a bottom mold of the apparatus for making a molded article with a hardened skin on the bottom surface thereof in accordance with a first exemplary embodiment of the method of the present invention.

Referring to FIG. 1, a first exemplary embodiment of the method of the present invention will now be described with reference to the diagram of a flow molding apparatus designated generally as numeral 10. Flow molding apparatus 10 includes a top electrode 12 and a bottom electrode 14, both of which are connected to an electromagnetic energy source (not shown) operable to generate an alternating electric field between the electrodes. The alternating electric field may be generated at frequencies ranging from 1 MHz to 500 MHz, is preferably generated at frequencies ranging from 10 MHz to 100 MHz, and is most preferably generated at either 26 MHz or 40 MHz. Also included within apparatus 10 are a top mold 16 and a bottom mold 18 that together define a molding cavity therebetween.

In the illustrated example, a foam material 20 is placed within the molding cavity such that a top surface of foam material 20 is in contact with top mold 16 and a bottom surface of foam material 20 is in contact with bottom mold 18. Of course, it should be understood that additional formable materials could also be placed within the molding cavity as described in Applicant's co-pending patent application entitled "Method of Making a Molded Article from Two or more Different Formable Materials in a Single Heating Cycle" (U.S. patent application Ser. No. 10/890,904), which is incorporated herein by reference. In operation, an alternating dielectric field is applied across foam material 20 to thereby form the molded article.

It should be understood that flow molding apparatus 10 is merely an example of an apparatus that may be used to make a molded article in accordance with the method of the present invention. Other flow molding apparatuses and related methods may also be used, such as those disclosed in U.S. Pat. No. 4,268,238, U.S. Pat. No. 4,441,876, U.S. Pat. No. 4,524,037 and U.S. Pat. No. 4,851,167, all of which are incorporated herein by reference.

Referring still to FIG. 1, it can be seen that there are three layers of material between top electrode 12 and bottom electrode 14, namely, top mold 16 (layer 1), foam material 20 (layer 2), and bottom mold 18 (layer 3). The following general equations may be established with respect to these three layers of material (which will be used hereinbelow to describe the method of the present invention). It should be understood that the subscript i in these equations denotes the layer number of the particular material (i.e., subscript 1 denotes top mold 16 (layer 1), subscript 2 denotes foam material 20 (layer 2), and subscript 3 denotes bottom mold 18 (layer 3)).

First, the capacitance of each layer of material may be expressed by the following equation:

$$C_i = \frac{25.4 \times \varepsilon_i \times A_i}{36 \times \pi \times d_i} \quad (1)$$

where
$C_i$=capacitance of layer i in picofarads
$\varepsilon_i$=relative dielectric constant of layer i
$A_i$=area of layer i in inches$^2$
$d_i$=thickness of layer i in inches.

The equivalent capacitance of all three layers of material is given by the following equation:

$$Ceq = \frac{C_1 \times C_2 \times C_3}{(C_1 \times C_2) + (C_1 \times C_3) + (C_2 \times C_3)} \quad (2)$$

where
$C_{eq}$=equivalent capacitance of layers in picofarads
$C_1$=capacitance of layer 1 in picofarads
$C_2$=capacitance of layer 2 in picofarads
$C_3$=capacitance of layer 3 in picofarads.

The equivalent reactance associated with the equivalent capacitance of all three layers of material may then be given by the following equation:

$$X_{eq} = \frac{1}{2 \times \pi \times f \times C_{eq}} \quad (3)$$

where
$X_{eq}$=equivalent reactance of layers in ohms
f=frequency of dielectric field in hertz
$C_{eq}$=equivalent capacitance of layers in farads.

The resistance of each layer of material is equal to the product of the power factor of that layer and the equivalent reactance. Therefore, using the equivalent reactance from equation (3), the resistance of each layer of material may be expressed as follows:

$$R_i = \frac{pf_i}{2 \times \pi \times f \times C_i} \quad (4)$$

where
$R_i$=resistance of layer i in ohms
$pf_i$=power factor of layer i
f=frequency of dielectric field in hertz
$C_i$=capacitance of layer i in farads.

Next, the current passing between top electrode 12 and bottom electrode 14 through all three layers of material may be represented by the following equation:

$$I = \frac{V}{\sqrt{X_{eq}^2 + R_{eq}^2}} \quad (5)$$

where
I=current in amperes
V=voltage between the electrodes in volts
$X_{eq}$=equivalent reactance of layers in ohms
$R_{eq}$=equivalent resistance of layers in ohms.

Assuming that the equivalent resistance of all three layers of material is small compared to the equivalent reactance, equation (5) may be simplified as follows:

$$I = \frac{V}{X_{eq}} \quad (6)$$

Furthermore, the power that is dissipated in each layer of material due to the application of the dielectric field may be expressed by the following equation:

$$P_i = R_i \times I^2 \quad (7)$$

where
- $P_i$=power of layer i in watts due to the dielectric field
- $R_i$=resistance of layer i in ohms
- I=current in amperes.

By combining equations (4) and (7), the power that is dissipated in each layer of material due to the application of the dielectric field may be expressed as follows:

$$P_i = \frac{pf_i \times I^2}{2 \times \pi \times f \times C_i} \qquad (8)$$

Now, the increase in temperature of each layer of material during the molding cycle may be represented by the following equation:

$$\Delta T_i = \frac{P_i \times t_i}{16.387 \times h_i \times \rho_i \times d_i} \qquad (9)$$

where
- $\Delta T_i$=increase in temperature of layer i in degrees Celsius
- $P_i$=power of layer i in watts due to the dielectric field
- $t_i$=molding time of layer i in seconds
- $h_i$=specific heat of layer i
- $\rho_i$=specific gravity of layer i
- $d_i$=thickness of layer i in inches.

By combining equations (8) and (9), the increase in temperature of each layer of material during the molding cycle may be expressed as follows:

$$\Delta T_i = \frac{pf_i \times I^2 \times t_i}{2 \times \pi \times f \times C_i \times 16.387 \times h_i \times \rho_i \times d_i} \qquad (10)$$

By solving equation (10) for $t_i$, the molding time for each layer of material may be expressed by the following equation:

$$t_i = \frac{16.387 \times \Delta T_i \times h_i \times \rho_i \times d_i}{\frac{pf_i \times I^2}{2 \times \pi \times f \times C_i}} \qquad (11)$$

Equation (11) may then be solved for $pf_i$ such that the power factor for each layer of material may be expressed as follows:

$$pf_i = \frac{16.387 \times \Delta T_i \times h_i \times \rho_i \times d_i \times 2 \times \pi \times f \times C_i}{t_i \times I^2} \qquad (12)$$

In accordance with the method of the present invention, a hardened skin may be formed on one or more surfaces of foam material 20. In this first exemplary embodiment, a hardened skin is formed on the entire bottom surface of foam material 20 (although it should be understood that a hardened skin could also be formed on the entire top surface of foam material 20 if desired). Accordingly, the following steps may be performed using the method of the present invention: (1) calculate the molding time of foam material 20; (2) modify top mold 16 so that the top surface of foam material 20 will be fully blown (and preferably cross-linked) at the end of the molding cycle; and (3) reduce the temperature of bottom mold 18 so that a hardened skin is formed on the entire bottom surface of foam material 20 at the end of the molding cycle. Each of these steps will be described in detail hereinbelow.

Step 1: Calculate Molding Time of Foam Material

First, equation (11) may be used to calculate the molding time ($t_2$) of foam material 20 (i.e., the time that it takes for foam material 20 to reach its molding temperature). It can be seen from equation (11) that the molding time ($t_2$) of foam material 20 is a function of the following factors: the increase in temperature ($\Delta T_2$) required for foam material 20 to reach its molding temperature; the specific heat ($h_2$) of foam material 20; the specific gravity ($\rho_2$) of foam material 20; the thickness ($d_2$) and capacitance ($C_2$) of foam material 20; the power factor ($pf_2$) of foam material 20; the current (I) passing between top electrode 12 and bottom electrode 14 (which may be calculated from equation (6)); and the frequency (f) of the dielectric field.

Step 2: Modify Top Mold so that Top Surface of Foam Material Will be Fully Blown Second, the molding time ($t_2$) of foam material 20 (as calculated in step 1) is used to calculate a required power factor ($pf_1$) for top mold 16. As stated above, the temperature of top mold 16 is desirably chosen so that the top surface of foam material 20 will be fully blown at the end of the molding cycle. As such, the required power factor ($pf_1$) for top mold 16 will be the power factor that allows the bottom surface of top mold 16 to reach a temperature that is substantially the same as the molding temperature of foam material 20 at the end of the molding cycle.

Equation (12) may be used to calculate the required power factor ($pf_1$) for top mold 16. It can be seen from equation (12) that the required power factor ($pf_1$) for top mold 16 is a function of the following factors: the increase in temperature ($\Delta T_1$) required for top mold 16 to reach the molding temperature of foam material 20; the specific heat ($h_1$) of top mold 16; the specific gravity ($\rho_1$) of top mold 16; the thickness ($d_1$) and capacitance ($C_1$) of top mold 16; the frequency (f) of the dielectric field; the molding time ($t_2$) of foam material 20; and the current (I) passing between top electrode 12 and bottom electrode 14 (which may be calculated from equation (6)).

Next, the power factor of top mold 16 is adjusted to match its required power factor. The power factor of top mold 16 may be adjusted by various means known in the art, and is preferably adjusted by selecting an additive, calculating an amount of the additive to be mixed with the material of top mold 16 so that the power factor substantially matches the required power factor, and then mixing the calculated amount of additive with the material of top mold 16. It should be understood that a selected additive may be used to increase or decrease the power factor of the material and, preferably, does not otherwise alter the properties of the material. It may also be desirable to use a mixture of two or more additives depending on the power factor of each of the additives as a function of temperature.

Once an additive(s) is selected for top mold 16, the following general equations may be used to calculate the amount of the additive to be mixed with the material of top mold 16 so that the power factor substantially matches the required power factor. First, the power factor equivalent for the material/additive mixture may be expressed by the following equation:

$$pf_{eq} = \frac{(pf_{material} \times d_{material} \times \varepsilon_{additive}) + (pf_{additive} \times d_{additive} \times \varepsilon_{material})}{(\varepsilon_{material} \times d_{additive}) + (\varepsilon_{additive} + d_{material})} \qquad (13)$$

where
- $pf_{eq}$=power factor equivalent of the material/additive mixture
- $pf_{material}$=power factor of the material to be modified
- $pf_{additive}$=power factor of the selected additive
- $d_{material}$=thickness of the material to be modified
- $d_{additive}$=thickness of the selected additive
- $\varepsilon_{material}$=relative dielectric constant of the material to be modified
- $\varepsilon_{additive}$=relative dielectric constant of the selected additive.

Now, assume x is the percentage of the mixture by volume comprising the additive and (100−x) is the percentage of the mixture by volume comprising the material. Substituting x for $d_{additive}$ and (100−x) for $d_{material}$, equation (13) may be rewritten as follows:

$$pf_{eq} = \frac{(pf_{material} \times (100-x) \times \varepsilon_{additive}) + (pf_{additive} \times x \times \varepsilon_{material})}{(\varepsilon_{material} \times x) + (\varepsilon_{additive} \times (100-x))} \quad (14)$$

Equation (14) may then be solved for x and rewritten as follows:

$$x = \frac{(100 \times pf_{material} \times \varepsilon_{additive}) - (100 \times pf_{eq} \times \varepsilon_{additive})}{(pf_{eq} \times \varepsilon_{material}) - (pf_{eq} \times \varepsilon_{additive}) + (pf_{material} \times \varepsilon_{additive}) - (pf_{additive} \times \varepsilon_{material})} \quad (15)$$

Thus, equation (15) may be used to calculate the amount of the selected additive to be mixed with the material of top mold 16 so that the power factor equivalent ($pf_{eq}$) of the mixture substantially matches the required power factor ($pf_1$) of top mold 16 calculated above (i.e., $pf_{eq}=pf_1$). As such, the bottom surface of top mold 16 will reach a temperature that is substantially the same as the molding temperature of foam material 20 whereby the top surface of foam material 20 will be fully blown at the end of the molding cycle. Accordingly, a hardened skin will not be formed on the top surface of the molded article.

Step 3: Reduce Temperature of Bottom Mold to Form Hardened Skin on Bottom Surface of Foam Material Third, the molding time ($t_2$) of foam material 20 (as calculated in step 1) is used to calculate the increase in temperature ($\Delta T_3$) of bottom mold 18 at the end of the molding cycle. Preferably, bottom electrode 14 is chilled throughout the molding cycle so that the temperature of bottom mold 18 may be substantially reduced to enable the formation of a hardened skin on the bottom surface of the molded article. Equation (10) may be used to calculate the increase in temperature ($\Delta T_3$) of bottom mold 18, which is a function of the following factors: the power factor ($pf_3$) of bottom mold 18; the current (I) passing between top electrode 12 and bottom electrode 14 (which may be calculated from equation (6)); the molding time ($t_2$) of foam material 20; the frequency (f) of the dielectric field; the specific heat ($h_3$) of bottom mold 18; the specific gravity ($\rho_3$) of bottom mold 18; and the thickness ($d_3$) and capacitance ($C_3$) of bottom mold 18.

Because the temperature of bottom mold 18 will be less than the temperature of foam material 20, a certain amount of heat will be transferred from foam material 20 to bottom mold 18 during the molding cycle. The amount of heat exchange will depend on the thermal conductivity ($k_2$) of foam material 20 and the thermal conductivity ($k_3$) of bottom mold 18. Specifically, the heat gained or lost by foam material 20 is given by the following equation:

$$Q_2 = k_2(T_{2,3} - T_2) \quad (16)$$

where
- $Q_2$=power gained/lost by layer 2 in watts due to heat exchange with layer 3
- $k_2$=thermal conductivity of layer 2 in watts/inches²/inch/°C.
- $T_2$=temperature of layer 2 in degrees Celsius
- $T_{2,3}$=temperature at the interface of layers 2 and 3 in degrees Celsius Similarly, the heat gained or lost by bottom mold 18 is given by the following equation:

$$Q_3 = k_3(T_{2,3} - T_3) \quad (17)$$

where
- $Q_3$=power gained/lost by layer 3 in watts due to heat exchange with layer 2
- $k_3$=thermal conductivity of layer 3 in watts/inches²/inch/°C.
- $T_{2,3}$=temperature at the interface of layers 2 and 3 in degrees Celsius
- $T_3$=temperature of layer 3 in degrees Celsius Because the heat gained or lost by foam material 20 ($Q_2$) is equal to the heat gained or lost by bottom mold 18 ($Q_3$) such that $Q_2+Q_3=0$, equations (16) and (17) may be combined as follows:

$$k_2(T_{2,3} - T_2) + k_3(T_{2,3} - T_3) = 0 \quad (18)$$

Equation (18) may then be solved for $T_{2,3}$ such that the temperature at the interface between foam material 20 and bottom mold 18 is given by the following equation:

$$T_{2,3} = \frac{k_2 T_2 + k_3 T_3}{k_2 + k_3} \quad (19)$$

Figure 2:
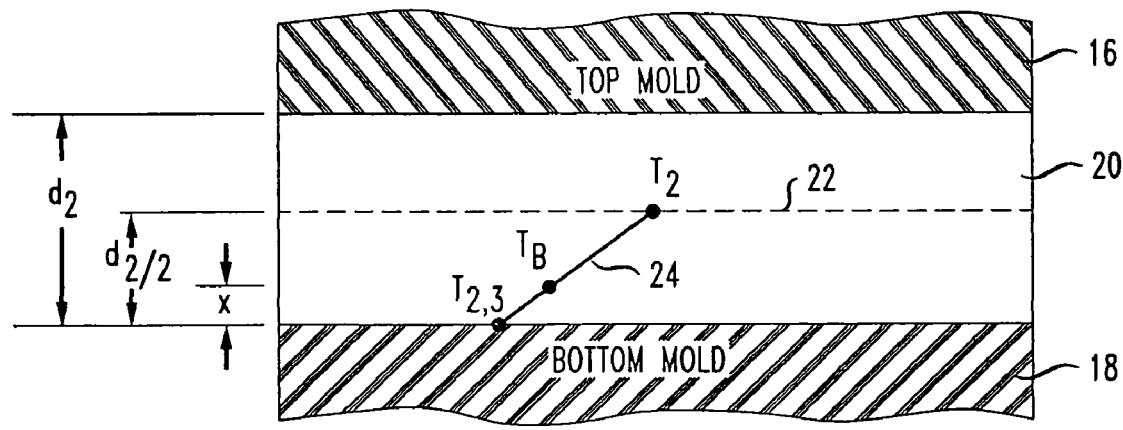
FIG. 2 is an enlarged view of the foam material in relation to the top and bottom molds of the flow molding apparatus of FIG. 1, wherein a thickness x of the foam material remains under the decomposition temperature of the blowing agent in the foam material to thereby form the hardened skin on bottom surface of the molded article.

Now, referring to FIG. 2, an enlarged view of foam material 20 in relation to top mold 16 and bottom mold 18 is provided wherein a centerline 22 has been drawn through foam material 20. Because the total thickness of foam material 20 is $d_2$, the thickness of foam material between centerline 22 and the interface of foam material 20 with bottom mold 18 is $d_2/2$. Of course, the thickness of foam material between centerline 22 and the interface of foam material 20 with top mold 16 would also be $d_2/2$.

At the end of the molding cycle, the temperature of foam material 20 at centerline 22 will be the molding temperature ($T_2$) of foam material 20. However, the temperature of foam material 20 below centerline 22 will vary from the molding temperature ($T_2$) of foam material 20 (i.e., the temperature at centerline 22) to the temperature ($T_{2,3}$) derived from equation (19) above (i.e., the temperature at the interface between foam material 20 and bottom mold 18). A temperature line 24 drawn from centerline 22 to the interface of foam material 20 with bottom mold 18 will have a slope represented by the following equation:

$$\text{slope} = \frac{T_2 - T_{2,3}}{\frac{d_2}{2}} \quad (20)$$

where
slope=slope of temperature line
$T_3$=temperature of layer 3 in degrees Celsius
$T_{2,3}$=temperature at the interface of layers 2 and 3 in degrees Celsius
$d_2$=thickness of layer 2 in inches It should be understood that the blowing agent in foam material 20 will have a decomposition temperature ($T_B$) associated therewith, which is less than the molding temperature ($T_2$) of foam material 20. Assuming that the decomposition temperature ($T_B$) of the blowing agent is greater than the temperature ($T_{2,3}$) at the interface between foam material 20 and bottom mold 18 (as shown in FIG. 2), the thickness (x) of foam material 20 that remains under the decomposition temperature ($T_B$) of the blowing agent may be represented by the following equation:

$$x = \frac{T_B - T_{2,3}}{\text{slope}} \tag{21}$$

where
x=thickness of layer 2 that remains under $T_B$ in inches
$T_B$=decomposition temperature of blowing agent in degrees Celsius
$T_{2,3}$=temperature at the interface of layers 2 and 3 in degrees Celsius
slope=slope of temperature line The thickness (x) of foam material 20 that remains under the decomposition temperature ($T_B$) of the blowing agent will not be blown at the end of the molding cycle and, thus, will form a hardened skin on the bottom surface of the molded article.

Based on the equations above, it should be understood that the thickness of the hardened skin formed on the bottom surface of the molded article is dependent on a variety of factors, including the thermal conductivity ($k_3$) of bottom mold 18, the power factor ($pf_3$) of bottom mold 18, and the temperature of bottom electrode 14. For example, the thickness of the hardened skin may be increased by increasing the thermal conductivity ($k_3$) of bottom mold 18, decreasing the power factor ($pf_3$) of bottom mold 18, and/or decreasing the temperature of bottom electrode 14. Conversely, the thickness of the hardened skin may be decreased by decreasing the thermal conductivity ($k_3$) of bottom mold 18, increasing the power factor ($pf_3$) of bottom mold 18, and/or increasing the temperature of bottom electrode 14. Thus, one or more of these factors may be adjusted in order to increase or decrease the thickness of the hardened skin as desired for a particular type of molded article.

It should be understood that the analysis set forth above will provide a close approximation of the values for the molding time ($t_2$) of foam material 20, the required power factor ($pf_1$) of top mold 16, the temperature ($T_3$) of bottom mold 18, and the thickness (x) of foam material 20 that remains under the decomposition temperature ($T_B$) of the blowing agent (which forms the hardened skin on the bottom surface of the molded article). However, if more exact values are desired, it is necessary to take into account the heat exchange between adjacent layers of material in time over the course of the molding cycle.

The heat generated in a layer of material i due to the adjacent layer i−1 may be expressed as follows:

$$Q_{i,i-1} = \frac{k_{i-1} \times k_i}{k_{i-1} + k_i}(T_{i-1} - T_i)\frac{2}{d_i} \tag{22}$$

where
$Q_{i,\,i-1}$=power of layer i in watts due to heat exchange from layer i−1
$k_{i-1}$=thermal conductivity of layer i−1 in watts/inches$^2$/inch/° C.
$k_i$=thermal conductivity of layer i in watts/inches$^2$/inch/° C.
$T_{i-1}$=temperature of layer i−1 in degrees Celsius
$T_i$=temperature of layer i in degrees Celsius
$d_i$=thickness of layer i in inches Similarly, the heat generated in a layer of material i due to the adjacent layer i+1 may be expressed as follows:

$$Q_{i,i+1} = \frac{k_{i+1} \times k_i}{k_{i+1} + k_i}(T_{i+1} - T_i)\frac{2}{d_i} \tag{23}$$

where
$Q_{i,\,i+1}$=power of layer i in watts due to heat exchange from layer i+1
$k_{i+1}$=thermal conductivity of layer i+1 in watts/inches$^2$/inch/° C.
$k_i$=thermal conductivity of layer i in watts/inches$^2$/inch/° C.
$T_{i+1}$=temperature of layer i+1 in degrees Celsius
$T_i$=temperature of layer i in degrees Celsius
$d_i$=thickness of layer i in inches Accordingly, equations (22) and (23) may be combined such that the heat generated in a layer of material i due to both of the adjacent layers i−1 and i+1 may be expressed as follows:

$$Q_i = \frac{2}{d_i}\left[\frac{k_{i-1} \times k_i}{k_{i-1} + k_i}(T_{i-1} - T_i) + \frac{k_{i+1} \times k_i}{k_{i+1} + k_i}(T_{i+1} - T_i)\right] \tag{24}$$

Now, by combining equations (8) and (24), the total power dissipated in a layer of material i due to the application of the dielectric field and the heat exchange between adjacent layers of material may be expressed as follows:

$$P_i + Q_i = \frac{pf_i \times I^2}{2 \times \pi \times f \times C_i} + \frac{2}{d_i}\left[\frac{k_{i-1} \times k_i}{k_{i-1} + k_i}(T_{i-1} - T_i) + \frac{k_{i+1} \times k_i}{k_{i+1} + k_i}(T_{i+1} - T_i)\right] \tag{25}$$

One skilled in the art will understand that equation (25) may be used (in place of equation (8)) in connection with the analysis set forth above to calculate more exact values for the molding time ($t_2$) of foam material 20, the required power factor ($pf_1$) of top mold 16, the temperature ($T_3$) of bottom mold 18, and the thickness (x) of foam material 20 that remains under the decomposition temperature ($T_B$) of the blowing agent. As will be described in greater detail with reference to Example 3 below, these calculations are preferably performed at regular time intervals (such as 1 second time intervals) in order to determine $P_i+Q_i$ for each of the layers of material at each of the time intervals. Of course, a computer may be programmed to perform these calculations in order to simplify the analysis.

It should also be understood that the analysis set forth above does not take into account the fact that the power factor, relative dielectric constant, specific heat and thermal conductivity of each of the layers of material vary with temperature. Therefore, when performing the calculations at regular time intervals as discussed above, it is preferable to use the values for the power factor, relative dielectric constant, specific heat and thermal conductivity that correspond to the temperature of each of the layers of material at that particular point in time. By doing so, it is possible to obtain even more exact values for the molding time ($t_2$) of foam material 20, the required power factor ($pf_1$) of top mold 16, the temperature ($T_3$) of bottom mold 18, and the thickness (x) of foam material 20 that remains under the decomposition temperature ($T_B$) of the blowing agent (which forms the hardened skin on the bottom surface of the molded article).

It should further be understood that the analysis set forth above does not consider the exothermic or endothermic reaction that occurs when a blowing agent reaches its decomposition temperature (which, for many blowing agents, is 150° C.). The change in heat caused by this exothermic or endothermic reaction varies in time and may be added to the above equations if desired. Of course, one skilled in the art will appreciate that the impact of the exothermic or endothermic reaction is not highly significant because it occurs near the end of the molding cycle and does not involve a large amount of energy.

Three examples will now be provided with reference to the flow molding apparatus of FIGS. 1 and 2 to further describe the method of the present invention. It should be understood that these examples are provided merely to illustrate the manner in which the method may be used to manufacture a molded article with a hardened skin and do not in any way limit the scope of the present invention.

Example 1

Assume for purposes of this example that top mold 16 and bottom mold 18 of flow molding apparatus 10 are each formed from silicone rubber V-1008 (manufactured by Rhodia Inc.) and foam material 20 comprises an EVA foam blend. Table 1 is provided below to show various factors for each of these layers of material, namely, the desired temperature (T) at the end of the molding cycle, thickness (d), power factor (pf), relative dielectric constant ($\in$), specific heat (h), and specific gravity ($\rho$). These factors will be used hereinbelow to perform various calculations in accordance with the method of the present invention.

TABLE 1

|  | Top Mold (layer 1) | Foam Material (layer 2) | Bottom Mold (layer 3) |
| --- | --- | --- | --- |
| Desired Temperature (T) (degrees Celsius) | 200 | 200 |  |
| Thickness (d) (inches) | .125 | .375 | .125 |
| Power Factor (pf) |  | .0137 | .0033 |
| Relative Dielectric Constant ($\in$) | 3.07 | 2.67 | 2.67 |
| Specific Heat (h) | 1.233 | 1.566 | 1.233 |
| Specific Gravity ($\rho$) | 1.16 | 1.041 | 1.16 |

As can be seen from Table 1, the desired temperature of foam material 20 at the end of the molding cycle is its molding temperature of 200° C. (the temperature at which foam material 20 is fully blown and cross-linked). In this example, it is desired that the top surface of the molded article be fully blown at the end of the molding cycle. As such, the desired temperature of the bottom surface of top mold 16 at the end of the molding cycle is 200° C. (the molding temperature of foam material 20). On the other hand, a hardened skin is desired on the bottom surface of the molded article at the end of the molding cycle. As such, bottom electrode 14 is chilled and maintained at 0° C. throughout the molding cycle so that the temperature of bottom mold 18 is substantially reduced. The exact temperature of bottom mold 18 at the end of the molding cycle will be calculated hereinbelow.

Table 1 also shows the various values for the thickness (d) of each of the layers of material which, as illustrated in FIG. 1, are shown as being constant along the length of the molded article. It should be understood, however, that the thickness of foam material 20 may vary at different points along the length of the molded article. In that case, bottom mold 18 would preferably be configured so that its thickness varies in such a manner that the sum of the thickness values for foam material 20 and bottom mold 18 remain constant. As such, the total distance between top electrode 12 and bottom electrode 14 would remain constant to thereby provide uniform heating of foam material 20 (as described in U.S. Pat. No. 4,268,238). It should also be noted that the relative dielectric constants ($\in$) of foam material 20 and bottom mold 18 would preferably be equalized (as shown in Table 1) so that foam material 20 would be uniformly heated (as discussed in U.S. Pat. No. 4,441,876).

Figure 3:
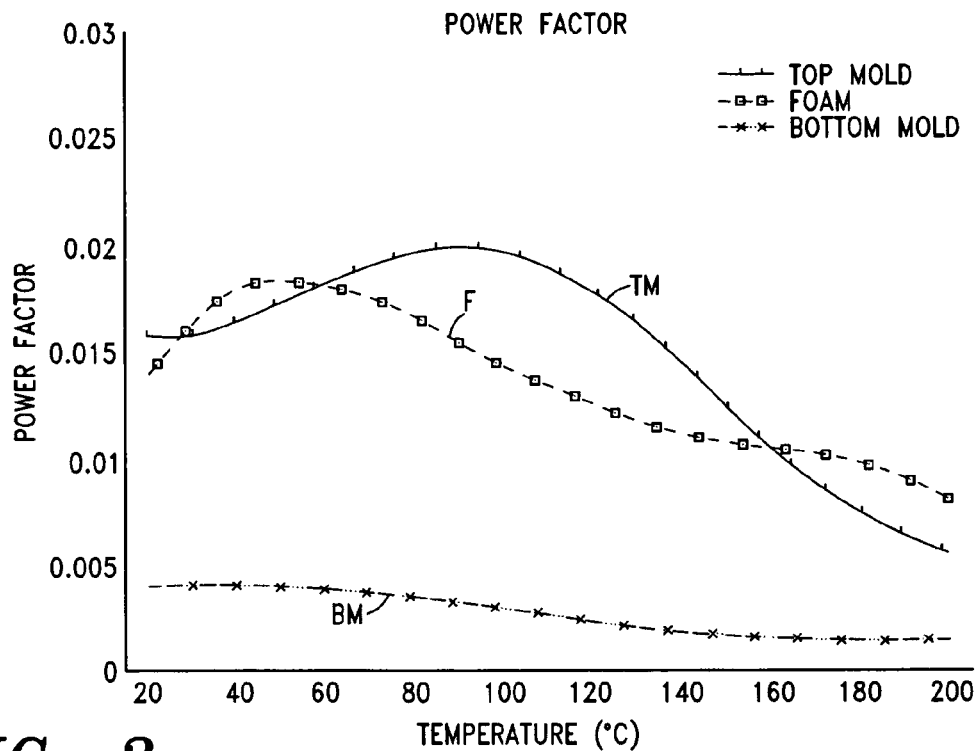
FIG. 3 is a graphical representation showing the relationship between the temperature (T) versus the power factor (pf) for each of the top mold, the foam material, and the bottom mold of the flow molding apparatus of FIG. 1.
Figure 4:
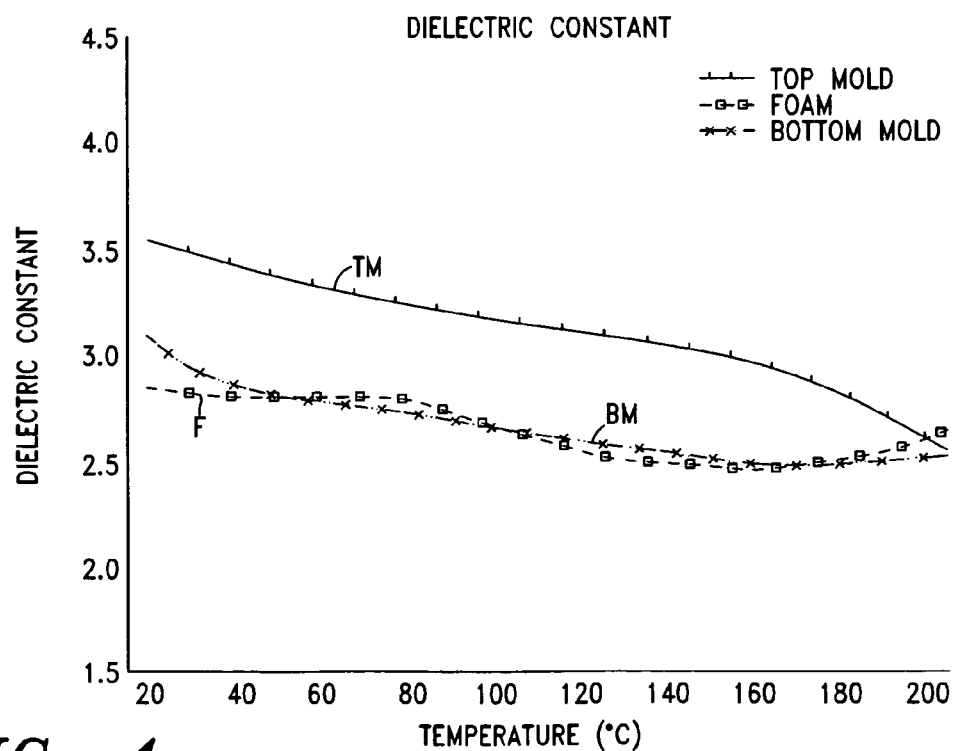
FIG. 4 is a graphical representation showing the relationship between the temperature (T) versus the relative dielectric constant (c) for each of the top mold, the foam material, and the bottom mold of the flow molding apparatus of FIG. 1.
Figure 5:
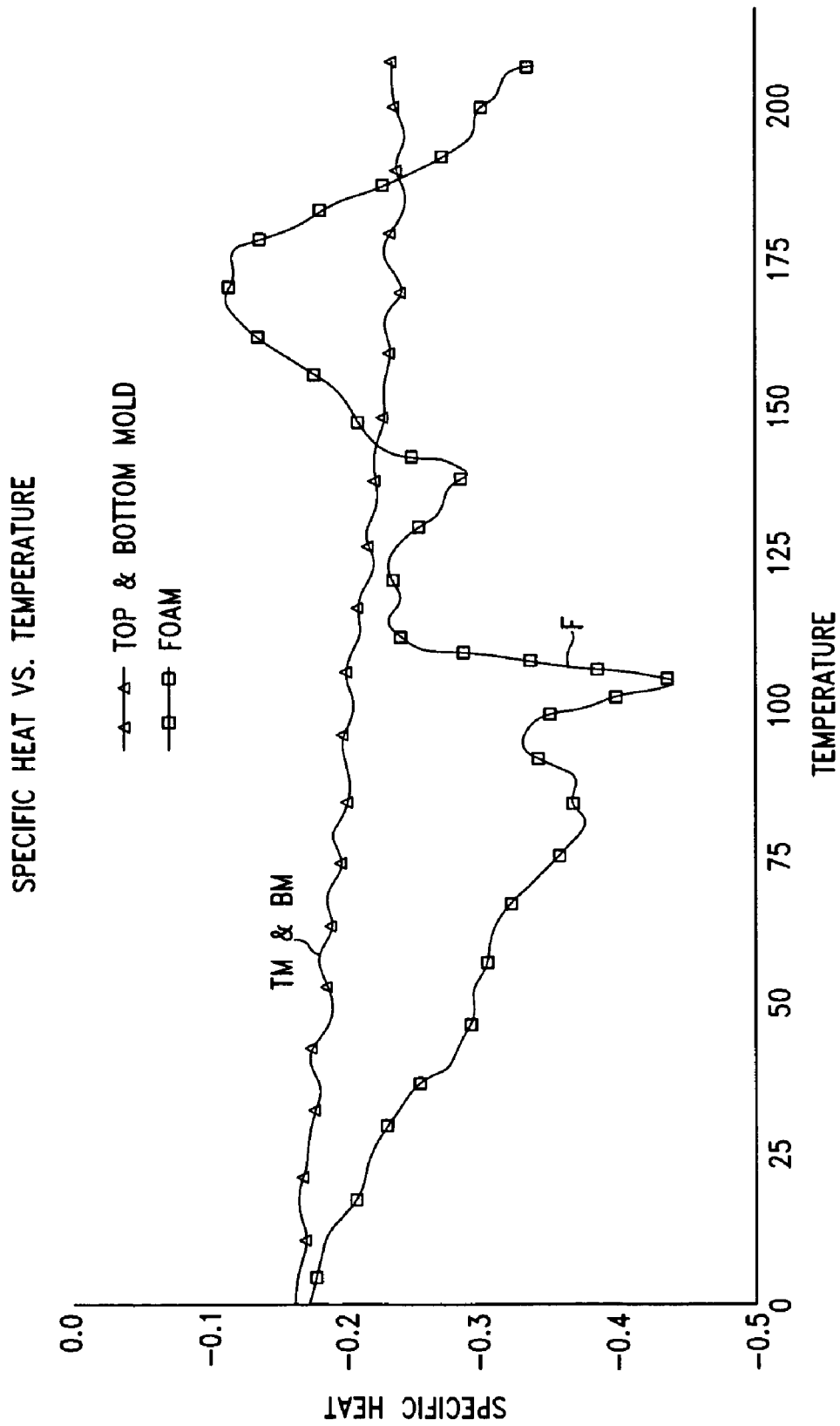
FIG. 5 is a graphical representation showing the relationship between the temperature (T) versus the specific heat (h) for each of the top mold, the foam material, and the bottom mold of the flow molding apparatus of FIG. 1.

In addition, Table 1 shows the various values for the power factor (pf), relative dielectric constant ($\in$), specific heat (h) and specific gravity ($\rho$) for each of the layers of material. As discussed above, the values for the power factor (pf), relative dielectric constant ($\in$) and specific heat (h) vary with temperature. For example, FIG. 3 illustrates the temperature dependence of the power factor (pf) for each of the layers of material, FIG. 4 illustrates the temperature dependence of the relative dielectric constant ($\in$) for each of the layers of material, and FIG. 5 illustrates the temperature dependence of the specific heat (h) for each of the layers of material. It should be understood that the curves of FIGS. 3-5 were each integrated over the entire temperature range and the resultant averages are shown in Table 1 (which will be used to provide a close approximation of various values in accordance with the analysis set forth above).

In accordance with the method of the present invention, equations (1)-(21) may be used to calculate the molding time of foam material 20, the required power factor of top mold 16, the temperature of bottom mold 18, and the thickness of foam material 20 that remains under the decomposition temperature of the blowing agent. It should be understood that the subscripts used in the following equations denote the layer number of the particular material (i.e., subscript 1 denotes top mold 16 (layer 1), subscript 2 denotes foam material 20 (layer 2), and subscript 3 denotes bottom mold 18 (layer 3)).

The capacitance of each of the layers of material may be calculated from equation (1) using the values for the relative dielectric constant ($\epsilon_i$) and thickness ($d_1$) shown in Table 1 (assuming that the area of each of the layers of material is 1 inch$^2$):

$$C_1 = \frac{25.4 \times 3.07 \times 1}{36 \times \pi \times .123} = 5.429 \, \text{pF}$$

$$C_2 = \frac{25.4 \times 2.67 \times 1}{36 \times \pi \times .375} = 1.599 \, \text{pF}$$

$$C_3 = \frac{25.4 \times 2.67 \times 1}{36 \times \pi \times .125} = 4.72 \, \text{pF}$$

Next, the equivalent capacitance may be calculated from equation (2) using the capacitance values for each of the layers of material derived above:

$$C_{eq} = \frac{5.429 \times 1.599 \times 4.72}{(5.429 \times 1.599) + (5.429 \times 4.72) + (1.599 \times 4.72)} = 0.954 \, \text{pF}$$

The equivalent reactance may then be calculated from equation (3) using the equivalent capacitance ($C_{eq}$) derived above (assuming that the frequency of the electric field is 40 MHz):

$$X_{eq} = \frac{1}{2 \times \pi \times 40 \times 10^6 \times .954 \times 10^{-12}} = 4{,}171 \, \text{ohms}$$

The current passing between top electrode 112 and bottom electrode 114 through all of the layers of material may then be calculated from equation (6) using the equivalent reactance ($X_{eq}$) derived above (assuming that the voltage is 4,000 volts):

$$I = \frac{4{,}000}{4{,}171} = .959 \, \text{amperes}$$

First, in accordance with step 1 above, the molding time for foam material 20 may be calculated from equation (11) using the current (I) and capacitance ($C_2$) derived above and the values for the temperature ($T_2$), thickness ($d_2$), power factor ($pf_2$), specific heat ($h_2$), and specific gravity ($\rho_2$) shown in Table 1 (assuming that the starting temperature is 0° C.):

$$t_2 = \frac{16.387 \times 200 \times 1.566 \times 1.041 \times .375}{\frac{.0137 \times .959^2}{2 \times \pi \times 40 \times 10^6 \times 1.599 \times 10^{-12}}} = 63.54 \, \text{sec}$$

Thus, the molding time for foam material 20 is 63.54 seconds (i.e., the time that it takes foam material 20 to reach its molding temperature of 200° C.).

Second, in accordance with step 2 above, a required power factor for top mold 16 may be calculated from equation (12) using the molding time ($t_2$) for foam material 20, the current (I) and capacitance ($C_1$) derived above, and the values for the temperature ($T_1$), thickness ($d_1$), specific heat ($h_1$), and specific gravity ($\rho_1$) shown in Table 1 (again, assuming that the starting temperature is 0° C.):

$$pf_1 = \frac{16.387 \times 200 \times 1.233 \times 1.16 \times .125 \times 2 \times \pi \times 40 \times 10^6 \times 5.429 \times 10^{12}}{63.54 \times .959^2} = 0.01368$$

Thus, the required power factor for top mold 16 is 0.01368 (i.e., the power factor that would allow the bottom surface of top mold 16 to reach a temperature of 200° C. at substantially the same time that foam material 20 reaches its molding temperature of 200° C.). It should be understood that the power factor of top mold 16 may be adjusted by selecting a polar additive, calculating the amount of the polar additive to be mixed with the material of top mold 16 so that the power factor matches the required power factor derived above, and then mixing the calculated amount of the polar additive with the material of top mold 16.

Third, in accordance with step 3 above, the temperature of bottom mold 18 at the end of the molding cycle may be calculated from equation (10) using the current (I), the calculated molding time ($t_2$) for foam material 20, and the capacitance ($C_3$) derived above, and the values for the power factor ($pf_3$), specific heat ($h_3$), specific gravity ($\rho_3$), and thickness ($d_3$) shown in Table 1:

$$T_3 = \frac{.0033 \times 63.54 \times .959^2}{1.233 \times 1.16 \times .125 \times 16.387 \times 2 \times \pi \times 40 \times 10^6 \times 4.72 \times 10^{12}} = 55.48° \, \text{C.}$$

Thus, the temperature of bottom mold 18 at the end of the molding cycle is 55.48° C. (assuming bottom electrode 14 is chilled and maintained at 0° C. throughout the molding cycle).

Next, the temperature at the interface between foam material 20 and bottom mold 18 may be calculated from equation (19) using the temperature ($T_3$) of bottom mold 18 derived above and the value for the temperature ($T_2$) of foam material 20 shown in Table 1 (assuming that the thermal conductivity of foam material 20 is 0.00638 and the thermal conductivity of bottom mold 18 is 0.00585):

$$T_{2,3} = \frac{(.00638 \times 200) + (.00585 \times 55.48)}{.00638 + .00585} = 130.87° \, \text{C.}$$

Thus, the temperature at the interface between foam material 20 and bottom mold 18 is 130.87° C.

Equation (20) may then be used to determine the slope of temperature line 24 using the temperature ($T_{2,3}$) at the interface between foam material 20 and bottom mold 18 derived above and the values for the temperature ($T_2$) of foam material 20 and the thickness ($d_2$) of foam material 20 shown in Table 1:

$$\text{slope} = \frac{200 - 130.87}{.1875} = 368.68° \, \text{C./inch}$$

Thus, the slope of temperature line 24 is 368.68° C./inch.

Now, the thickness (x) of foam material 20 that remains under the decomposition temperature ($T_B$) of the blowing agent may be calculated from equation (21) using the temperature ($T_{2,3}$) at the interface between foam material 20 and bottom mold 18 derived above and the slope of temperature line 24 derived above (assuming that the decomposition temperature ($T_B$) of the blowing agent in foam material 20 is 150° C.):

$$x = \frac{150 - 130.87}{368.68} = 0.0519 \text{ inches}$$

Thus, the thickness (x) of foam material 20 that remains under the decomposition temperature ($T_B$) of the blowing agent is 0.0519 inches. As such, a layer of foam material 20 having a thickness of 0.0519 inches will not be blown at the end of the molding cycle and, thus, will form a hardened skin on the bottom surface of the molded article.

Example 2

Assume for purposes of this example that bottom mold 18 is formed from silicone rubber V-1075 (manufactured by Rhodia Inc.), which contains iron oxide and thus has a higher thermal conductivity than the silicone rubber V-1008 used in Example 1. Specifically, the thermal conductivity of silicone rubber V-1075 is 0.0241. All of the calculations and values of Example 1 remain unchanged, with the exception of the following analysis.

The temperature at the interface between foam material 20 and bottom mold 18 may be calculated from equation (19) using the temperature ($T'_3$) of bottom mold 18 derived in Example 1 above and the value for the temperature ($T_2$) of foam material 20 shown in Table 1 (assuming that the thermal conductivity of foam material 20 is still 0.00638 while the thermal conductivity of bottom mold 18 is now 0.0241):

$$T_{2,3} = \frac{(.00638 \times 200) + (.0241 \times 55.48)}{.00638 + .0241} = 85.73° \text{ C.}$$

Thus, the temperature at the interface between foam material 20 and bottom mold 18 is now 85.73° C.

Equation (20) may then be used to determine the slope of temperature line 24 using the temperature ($T_{2,3}$) at the interface between foam material 20 and bottom mold 18 derived above and the values for the temperature ($T_2$) of foam material 20 and the thickness ($d_2$) of foam material 20 shown in Table 1:

$$\text{slope} = \frac{200 - 85.73}{.1875} = 609.44° \text{ C./inch}$$

Thus, the slope of temperature line 24 is now 609.44° C./inch.

Now, the thickness (x) of foam material 20 that remains under the decomposition temperature ($T_B$) of the blowing agent may be calculated from equation (21) using the temperature ($T_{2,3}$) at the interface between foam material 20 and bottom mold 18 derived above and the slope of temperature line 24 derived above (again, assuming that the decomposition temperature ($T_B$) of the blowing agent in foam material 20 is 150° C.):

$$x = \frac{150 - 85.73}{609.44} = 0.105 \text{ inches}$$

Thus, the thickness (x) of foam material 20 that remains under the decomposition temperature ($T_B$) of the blowing agent is now 0.105 inches. As such, a layer of foam material 20 having a thickness of 0.105 inches will not be blown at the end of the molding cycle and, thus, will form a hardened skin on the bottom surface of the molded article.

In comparing this example to Example 1, it can be seen that increasing the thermal conductivity ($k_3$) of bottom mold 18 functions to increase the thickness of the hardened skin formed on the bottom surface of the molded article. Alternatively, as discussed above, the thickness of the hardened skin could also be increased by decreasing the power factor ($pf_3$) of bottom mold 18 or decreasing the temperature of bottom electrode 14.

Example 3

In this example, equation (25) (which is a combination of equations (8) and (24)) will be used to calculate more exact values for the molding time ($t_2$) of foam material 20, the temperature ($T_3$) of bottom mold 18, and the thickness (x) of foam material 20 that remains under the decomposition temperature ($T_B$) of the blowing agent (as compared to the values calculated in Example 1 above). It should be understood that the subscripts used in the following equations denote the layer number of the particular material (i.e., subscript 1 denotes top mold 16 (layer 1), subscript 2 denotes foam material 20 (layer 2), subscript 3 denotes bottom mold 18 (layer 3), and subscript 4 denotes bottom electrode 14 (layer 4)).

The power ($P_2$) that is dissipated in foam material 20 due to the application of the dielectric field may be calculated from equation (8) using the current (I) and capacitance ($C_2$) derived in Example 1 above and the value for the power factor ($pf_2$) shown in Table 1 (assuming that the frequency of the electric field is 40 MHz):

$$P_2 = \frac{0.137 \times .959^2}{2 \times \pi \times 40 \times 10^6 \times 1.599 \times 10^{12}} = 31.352 \text{ watts}$$

The power ($Q_2$) that is generated in foam material 20 due to the heat exchange from top mold 16 and bottom mold 18 may be calculated from equation (24) using the thickness ($d_2$) of foam material 20 shown in Table 1:

$$Q_2 = \frac{2}{.375}\left[\frac{k_1 \times k_2}{k_1 + k_2}(T_1 - T_2) + \frac{k_2 \times k_3}{k_2 + k_3}(T_3 - T_2)\right]$$

As discussed above, top mold 16 is heated at the same rate as foam material 20 such that $T_1 - T_2 = 0$. Thus, the above equation may be simplified as follows (assuming that the thermal conductivity of foam material 20 is 0.00638 and the thermal conductivity of bottom mold 18 is 0.00585):

$$Q_2 = 5.333\left[\frac{.00585 \times .00638}{.00585 + .00638}(T_3 - T_2)\right] = .01627(T_3 - T_2).$$

Similarly, the power ($P_3$) that is dissipated in bottom mold 18 due to the application of the dielectric field may be calculated from equation (8) using the current (I) and capacitance ($C_3$) derived in Example 1 above and the value for the power factor ($pf_3$) shown in Table 1 (again, assuming that the frequency of the electric field is 40 MHz):

$$P_3 = \frac{.0033 \times .959^2}{2 \times \pi \times 40 \times 10^6 \times 4.72 \times 10^{-12}} = 2.558 \text{ watts}$$

The power ($Q_3$) that is generated in bottom mold 18 due to the heat exchange from foam material 20 and bottom electrode 14 may be calculated from equation (24) using the thickness ($d_3$) of bottom mold 18 shown in Table 1:

$$Q_3 = \frac{2}{.125}\left[\frac{k_2 \times k_3}{k_2 + k_3}(T_2 - T_3) + \frac{k_3 \times k_4}{k_3 + k_4}(T_4 - T_3)\right]$$

As discussed above, bottom electrode 14 is chilled and maintained at 0° C. throughout the molding cycle such that $T_4=0$. Also, because the thermal conductivity ($k_4$) of bottom electrode 14 is very large compared to the thermal conductivity ($k_3$) of bottom mold 18, the above equation may be simplified as follows (again, assuming that the thermal conductivity of foam material 20 is 0.00638 and the thermal conductivity of bottom mold 18 is 0.00585):

$$Q_3 = \frac{2}{.125}\left[\frac{.00638 \times .00585}{.00638 + .00585}(T_2 - T_3) + .00585(0 - T_3)\right]$$
$$= 0.0488 T_2 - 0.0936 T_3$$

Now, the time ($\Delta t$) required for foam material 20 to reach its molding temperature of 200° C. may be expressed by the following equation using the power ($P_2$) and ($Q_2$) derived above and the values for the thickness ($d_2$), specific heat ($h_2$), and specific gravity ($\rho_2$) shown in Table 1:

$$\Delta t = \frac{\Delta T_2 \times h_2 \times \rho_2 \times d_2 \times 16.387}{P_2 + Q_2} \quad (26)$$
$$= \frac{\Delta T_2 \times 1.566 \times 1.0408 \times .375 \times 16.387}{31.352 + .01627(T_3 - T_2)}$$

Next, the increase in the temperature ($\Delta T_3$) of bottom mold 18 may be expressed by the following equation using the power ($P_3$) and ($Q_3$) derived above and the values for the thickness ($d_3$), specific heat ($h_3$), and specific gravity ($\rho_3$) shown in Table 1:

$$\Delta T_3 = \frac{\Delta t(P_3 + Q_3)}{h_3 \times \rho_3 \times d_3 \times 16.387} \quad (27)$$
$$= \frac{\Delta t(2.558 + .0488 T_2 - .0936 T_3)}{1.509 \times 1.105 \times .125 \times 16.387}$$
$$= \Delta t(.7489 + \ldots 01429 T_2 - .0274 T_3)$$

Equations (26) and (27) will now be calculated at 1 second time intervals in order to calculate more exact values for the molding time ($t_2$) of foam material 20, the temperature ($T_3$) of bottom mold 18, and the thickness (x) of foam material 20 that remains under the decomposition temperature ($T_B$) of the blowing agent.

At the beginning of the molding cycle, the temperature ($T_2$) of foam material 20 is 0° C. and the temperature ($T_3$) of bottom mold 18 is 0° C. Thus, after a 1 second time interval, equation (26) may be expressed as follows:

$$1 = \frac{\Delta T_2 \times 1.566 \times 1.0408 \times .375 \times 16.387}{31.352 + .01627(0 - 0)}$$

This equation may then be solved such that $\Delta T_2=3.13°$ C. As such, the temperature ($T_2$) of foam material 20 after 1 second of heating is 3.13° C. Equation (27) may also be expressed as follows:

$\Delta T_3=1(0.7489+0.01429(0)+0.0274(0))$

This equation may then be solved such that $\Delta T_3=0.7489°$ C. As such, the temperature ($T_3$) of bottom mold 18 after 1 second of heating is 0.7489° C.

Now, after another 1 second time interval, equation (26) may be expressed as follows:

$$1 = \frac{\Delta T_2 \times 1.566 \times 1.0408 \times .375 \times 16.387}{31.352 + .01627(.7489 - 3.13)}$$

This equation may then be solved such that $\Delta T_2=3.126°$ C. As such, the temperature ($T_2$) of foam material 20 after 2 seconds of heating is 6.250° C. Equation (27) may also be expressed as follows:

$\Delta T_3=1(0.7489+0.01429(3.13)+0.0274(0.7489))$

This equation may then be solved such that $\Delta T_3=0.7731°$ C. As such, the temperature ($T_3$) of bottom mold 18 after 2 seconds of heating is 1.522° C.

It should be understood that the above steps may be repeated at every 1 second time interval until the temperature ($T_2$) of foam material 20 reaches 200° C. By doing so, it can be determined that the molding time ($t_2$) of foam material 20 is 66 seconds (compared to 63.54 seconds as calculated in Example 1). Also, after 66 seconds of heating, the temperature ($T_3$) of bottom mold 18 is 78.83° C. (compared to 55.48° C. as calculated in Example 1). In addition, the temperature ($T_{2,3}$) at the interface of foam material 20 and bottom mold 18 after 66 seconds of heating is 142° C. (compared to 130.87° C. as calculated in Example 1). As such, the thickness (x) of foam material 20 that remains under the decomposition temperature ($T_B$) of the blowing agent is 0.0258 inches (compared to 0.0519 inches as calculated in Example 1).

Thus, it can be seen that calculating equations (26) and (27) at regular time intervals results in more accurate values for the molding time ($t_2$) of foam material 20, the temperature ($T_3$) of bottom mold 18 at the end of the molding cycle, and the thickness (x) of foam material 20 that remains under the decomposition temperature ($T_B$) of the blowing agent.

SECOND EXEMPLARY EMBODIMENT

Figure 6:
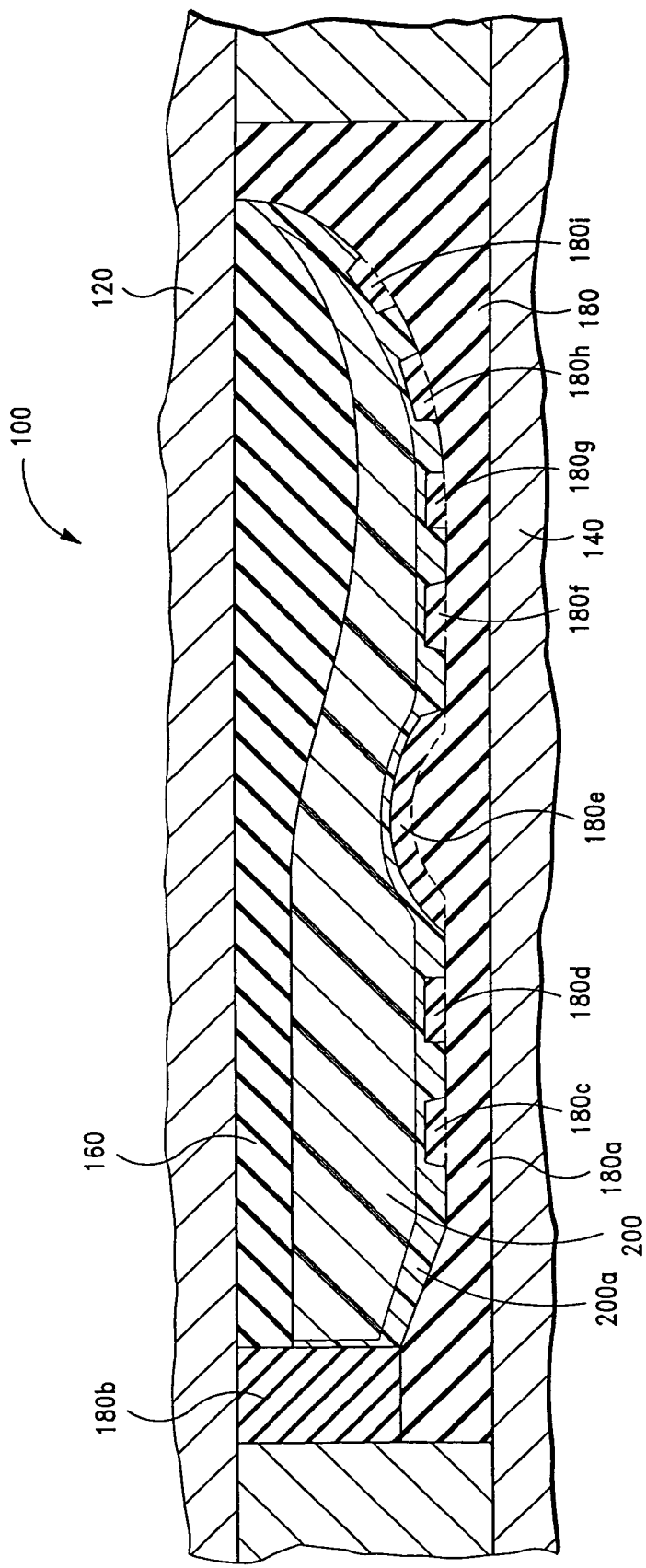
FIG. 6 is a diagram of a flow molding apparatus, wherein a foam material has been placed between a top mold and a bottom mold of the apparatus for making a molded article with different thicknesses of hardened skin on the bottom surface thereof in accordance with a second exemplary embodiment of the method of the present invention.

Referring to FIG. 6, a second exemplary embodiment of the method of the present invention will now be described with reference to the diagram of a flow molding apparatus designated generally as numeral 100, which is used to form the bottom sole of a tennis shoe or other athletic footwear. It should be understood that all of the equations set forth above in connection with the first exemplary embodiment also apply to the second exemplary embodiment, in which two different thicknesses of hardened skin are formed on the bottom surface of the shoe sole.

Flow molding apparatus 100 includes a top electrode 120 and a bottom electrode 140, both of which are connected to an electromagnetic energy source (not shown) operable to generate an alternating electric field between the electrodes. The alternating electric field may be generated at frequencies ranging from 1 MHz to 500 MHz, is preferably generated at frequencies ranging from 10 MHz to 100 MHz, and is most preferably generated at either 26 MHz or 40 MHz.

Also included within apparatus 100 are a top mold 160 and a bottom mold 180 that together define a molding cavity therebetween. As can be seen in FIG. 6, the top mold 160 is configured to define the shape of the top surface of the shoe sole, and the bottom mold 180 is configured to define the shape of the bottom surface of the shoe sole. The bottom mold 180 is formed of various mold sections 180a, 180b, 180c, 180d, 180e, 180f, 180g, 180h and 180i that together form a unitary piece. In the illustrated example, a foam material 200 is placed within the molding cavity such that a top surface of foam material 200 is in contact with top mold 160 and a bottom surface of foam material 200 is in contact with the various mold sections of bottom mold 180. In operation, an alternating dielectric field is applied across foam material 200 to thereby form the molded article.

In accordance with the method of the present invention, a first thickness of hardened skin is formed on the foam material 200 in contact with mold section 180a, and a second thickness of hardened skin is formed on the foam material 200 in contact with mold sections 180b-180i. The first and second thicknesses of hardened skin are shown collectively as numeral 200a in FIG. 6 and, as can be seen, are formed on a horizontal wall, on a slope, and on a vertical wall of the bottom mold 180. In this embodiment, a hardened skin is not desired on the foam material 200 in contact with top mold 160 so as to provide cushioning along the top surface of the shoe sole. Of course, it should be understood that one or more thicknesses of hardened skin could also be formed on the top surface of foam material 200 if desired (i.e., in other embodiments).

An example will now be provided with reference to the flow molding apparatus of FIG. 6 to further describe the method of the present invention. It should be understood that this example is provided merely to illustrate the manner in which the method may be used to manufacture a molded article with two or more thicknesses of hardened skin and does not in any way limit the scope of the present invention.

Example 4

Assume for purposes of this example that top mold 160 and bottom mold 180 of flow molding apparatus 100 are each formed from liquid silicone rubber and foam material 200 comprises an EVA foam blend (wherein the decomposition temperature of the blowing agent is approximately 310° F.). Table 2 is provided below to show various factors for each of these layers of material, namely, the desired temperature (T) at the end of the molding cycle, power factor (pf), relative dielectric constant ($\in$), specific heat (h), and specific gravity ($\rho$). These factors will be used hereinbelow to perform various calculations in accordance with the method of the present invention. It should also be noted that the alternating electric field generated between the electrodes in this example is 40 MHz.

TABLE 2

|  | Top Mold (layer 1) | Foam Material (layer 2) | Bottom Mold (layer 3) |
| --- | --- | --- | --- |
| Desired Temperature (T) (degrees Fahrenheit) | 380 | 380 | |

TABLE 2-continued

|  | Top Mold (layer 1) | Foam Material (layer 2) | Bottom Mold (layer 3) |
| --- | --- | --- | --- |
| Power Factor (pf) | .003 | .028 | .003 |
| Relative Dielectric Constant ($\epsilon$) | 3.07 | 3.07 | 3.07 |
| Specific Heat (h) | 1.233 | 1.34 | 1.233 |
| Specific Gravity ($\rho$) | 1.16 | 1.041 | 1.16 |

As can be seen from Table 2, the desired temperature of foam material 200 at the end of the molding cycle is 380° F. (i.e., higher than the decomposition temperature of the blowing agent so that it will be fully blown and cross-linked). In this example, it is desired that the top surface of the shoe sole be fully blown at the end of the molding cycle. As such, the desired temperature of the bottom surface of top mold 160 at the end of the molding cycle is also 380° F. On the other hand, two different thicknesses of hardened skin are desired on the bottom surface of the shoe sole at the end of the molding cycle. As such, bottom electrode 140 is chilled throughout the molding cycle so that the temperatures of the various mold sections of bottom mold 180 are substantially reduced. The exact temperatures of these various mold sections will be calculated hereinbelow.

Table 2 also shows the various values for the power factor (pf), relative dielectric constant ($\in$), specific heat (h) and specific gravity ($\rho$) for each of the layers of material. As discussed above in connection with the first exemplary embodiment, the values for the power factor (pf), relative dielectric constant ($\in$) and specific heat (h) vary with temperature. It should be understood that the value-temperature curves (similar to those shown in FIGS. 3-5) were each integrated over the entire temperature range and the resultant averages are shown in Table 2, which will be used below to provide a close approximation of the following the molding time for foam material 200, the required power factor for top mold 160, the increase in temperature of bottom mold section 180a, and the required power factor for mold sections 180b-180i. It should be understood that equations (25)-(27) may be used to calculate more exact values as discussed above in connection with Example 3 of the first exemplary embodiment, wherein a computer may be programmed to perform these calculations in order to simplify the analysis.

Notably, the relative dielectric constants ($\in$) of top mold 160, foam material 200 and bottom mold 180 are equalized (as shown in Table 2) so as to achieve uniform heating of foam material 200. Because the dielectric constants (s) have been equalized, the capacitance (C) will be the same in every section of the mold (see equation (1) above) and, as a result, the equivalent reactance ($X_{eq}$) associated with the equivalent capacitance ($C_{eq}$) of all three layers of material will be the same in every section of the mold (see equation (3) above). Assuming that the equivalent resistance ($R_{eq}$) of all three layers of material is small compared to the equivalent reactance ($X_{eq}$), it follows that the current (I) will be the same in every section of the mold (see equation (6) above).

Now, by combining equations (1) and (12) above, the power factor for each layer of material may be expressed as follows:

$$pf_i = \frac{16.387 \times \Delta T_i \times h_i \times \rho_i \times d_i \times 2 \times \pi \times f}{t_i \times I^2} \times \frac{25.4 \times \varepsilon_i \times A_i}{36 \times \pi \times d_i} \quad (26)$$

If we study the power factor for a unit of area of 1 inch², equation (26) may be simplified as follows:

$$pf_i = \frac{\Delta T_i \times h_i \times \rho_i}{t_i} \times \frac{16.387 \times 25.4 \times \varepsilon_i \times 2 \times \pi \times f}{36 \times \pi \times I^2} \quad (27)$$

As discussed above, the dielectric constant (∈) and the current (I) are the same in every section of the mold (wherein/may be calculated using equations (1)-(5) above). As such, equation (27) may be expressed as follows:

$$pf_i = \frac{\Delta T_i \times h_i \times \rho_i}{t_i} \times \text{constant} \quad (28)$$

wherein, in this example, the constant is $1.902 \times 10^{-3}$.

Equation (28) may be solved for $t_i$ such that the molding time of layer i may be expressed as follows:

$$t_i = \frac{\Delta T_i \times h_i \times \rho_i \times 1.902 \times 10^{-3}}{pf_i} \quad (29)$$

Equation (28) may also be solved for $\Delta T_i$ such that the increase in temperature of layer i may be expressed as follows:

$$\Delta T_i = \frac{t_i \times pf_i}{h_i \times \rho_i \times 1.902 \times 10^{-3}} \quad (30)$$

In accordance with the method of the present invention, equations (28)-(30) may be used to calculate: (1) the molding time of foam material 200; (2) the required power factor for top mold 160 so that the top surface of foam material 200 will be fully blown and preferably cross-linked at the end of the molding cycle; (3) the increase in temperature of bottom mold section 180a so as to form a thick skin on certain bottom surfaces of foam material 200 at the end of the molding cycle; and (4) the required power factor for mold sections 180b-180i so as to form a thin skin on certain bottom surfaces of foam material 200 (i.e., the heel and recessed portions) at the end of the molding cycle. In these equations, subscript 1 denotes top mold 160, subscript 2 denotes foam material 200, subscript 3 denotes bottom mold section 180a, and subscript 4 denotes bottom mold sections 180b-180i.

First, equation (29) may be used to calculate the molding time of foam material 200 using the values for the specific heat (h), specific gravity (ρ) and power factor (pf) shown in Table 2 (assuming that the starting temperature is 70° F. ambient temperature):

$$t_2 = \frac{\Delta T_2 \times h_2 \times \rho_2 \times 1.902 \times 10^{-3}}{pf_2}$$
$$= \frac{310 \times 1.34 \times 1.041 \times 1.902 \times 10^{-3}}{.028}$$
$$= 29.4 \text{ seconds}$$

Thus, the molding time for foam material 200 is 29.4 seconds (i.e., the time that it takes foam material 200 to reach 380° F.).

Second, the molding time ($t_2$) for foam material 200 (as calculated above) is used to calculate a required power factor ($pf_1$) for top mold 160. As stated above, the temperature of top mold 160 is desirably chosen so that the top surface of foam material 200 will be fully blown at the end of the molding cycle. As such, the required power factor ($pf_1$) for top mold 160 will be the power factor that allows the bottom surface of top mold 160 to reach a temperature that is substantially the same as the molding temperature of foam material 200 at the end of the molding cycle. The required power factor ($pf_1$) for top mold 160 may be calculated from equation (28) using the molding time (t) for foam material 200 and the values for the specific heat (h) and specific gravity (ρ) shown in Table 2 (again, assuming that the starting temperature is 70° F. ambient temperature):

$$pf_1 = \frac{\Delta T_1 \times h_1 \times \rho_1}{t_2} \times 1.902 \times 10^{-3}$$
$$= \frac{310 \times 1.233 \times 1.16}{29.4} \times 1.902 \times 10^{-3}$$
$$= 0.0286$$

Thus, the required power factor for top mold 160 is 0.0286. It should be understood that the power factor of top mold 160 may be adjusted by selecting a polar additive, calculating the amount of the polar additive to be mixed with the material of top mold 160 so that the power factor matches the required power factor derived above (using equation (15) above), and then mixing the calculated amount of the polar additive with the material of top mold 160.

Third, the molding time ($t_2$) for foam material 200 (as calculated above) is used to calculate the increase in temperature ($\Delta T_3$) of bottom mold section 180a at the end of the molding cycle. Preferably, bottom electrode 140 is chilled throughout the molding cycle so that the temperature of bottom mold section 180a may be substantially reduced to enable the formation of a thick skin on the bottom surface of the shoe sole as needed to withstand the abrasion that occurs during normal use of the shoe sole. Preferably, the portions with this thick skin are chosen to have as small of an area as possible in order to minimize the weight of the shoe sole. The increase in temperature ($\Delta T_3$) of bottom mold section 180a may be calculated from equation (30) using the calculated molding time ($t_2$) for foam material 200 and the values for the power factor (pf), specific heat (h) and specific gravity (ρ) shown in Table 2:

$$\Delta T_3 = \frac{t_2 \times pf_3}{h_3 \times \rho_3 \times 1.902 \times 10^{-3}}$$
$$= \frac{29.4 \times .003}{1.233 \times 1.16 \times 1.902 \times 10^{-3}}$$
$$= 32.5° \text{ F.}$$

Thus, the temperature of bottom mold section 180a at the end of the molding cycle is 102.5° F. (32.5° F.+70° F. ambient temperature), which is quite cold and well below the decomposition temperature of the blowing agent. As such, mold section 180a will cool by thermal conductivity the portion of foam material 200 in contact therewith so as to form a thick skin on the bottom surface of the shoe sole. It should be understood that the thickness of the skin may be calculated using equation (21) above.

Fourth, the molding time ($t_2$) for foam material 200 (as calculated above) is used to calculate a required power factor ($pf_4$) for bottom mold sections 180b-180i. The temperature of bottom mold sections 180b-180i is desirably chosen to be 260° F., which is 50° F. below the decomposition temperature of the blowing agent and will cool by thermal conductivity the portion of foam material 200 in contact therewith so as to form a thin skin as needed to prevent tears and provide an aesthetically pleasing "look" for the shoe sole. The required power factor ($pf_4$) for bottom mold sections 180b-180i may be calculated from equation (28) using the molding time (t) for foam material 200 and the values for the specific heat (h) and specific gravity ($\rho$) shown in Table 2 (again, assuming that the starting temperature is 70° F. ambient temperature):

$$pf_4 = \frac{\Delta T_4 \times h_4 \times \rho_4}{t_2} \times 1.902 \times 10^{-3}$$
$$= \frac{190 \times 1.233 \times 1.16}{29.4} \times 1.902 \times 10^{-3}$$
$$= 0.0177$$

Thus, the required power factor for bottom mold sections 180b-180i is 0.0177. It should be understood that bottom mold sections 180b-180i may be adjusted by selecting a polar additive, calculating the amount of the polar additive to be mixed with the material of these bottom mold sections so that the power factor matches the required power factor derived above (using equation (15) above), and then mixing the calculated amount of the polar additive with the material of these bottom mold sections. It should also be understood that the thickness of the skin formed on bottom mold sections 180b-180i may be calculated using equation (21) above.

It should be understood that flow molding apparatus 100 is merely an example of an apparatus that may be used to make a molded article with different thicknesses of hardened skin in accordance with the method of the present invention. Other flow molding apparatuses and related methods may also be used, whereby a hardened skin of any desired thickness may be obtained on one or more surfaces (sides) of the molded article or on only a portion of a particular surface. The thickness of the hardened skin may vary between the various surfaces, and may be controlled by varying the temperature of the appropriate mold sections. In general, a high temperature for a particular mold section will result in no skin, a medium temperature for a particular mold section will result in a thin skin, and a low temperature for a particular mold section will result in a thick skin (wherein the high, medium and low temperatures are determined in relation to the decomposition temperature of the blowing agent).

Preferably, the temperature of each of the various mold sections (and thus the thickness of the skin) is controlled by mixing an appropriate amount of additive with the material of the mold section (e.g., an additive mixed with liquid silicone rubber), unless a thick skin is desired in which case no additive is used. Alternatively, the thickness of the skin may be controlled by one or more additional means, including:

(a) changing the thickness of a mold section (in the case where a mold section is heated, a thin mold section will result in a thicker skin than a thick mold section; in the case where a mold section remains cold, a thin mold section will result in a thicker skin than a thick mold section);

(b) changing the thermal conductivity of a mold section (mold compounds with a higher thermal conductivity will result in a thicker skin than mold compounds with a lower thermal conductivity);

(c) chilling one of the electrodes to a lower temperature than the other electrode (a chilled electrode with a lower temperature will result in a thicker skin than a chilled electrode with a higher temperature);

(d) using a three-dimensional electrode (a chilled electrode section that is closer to the foam material will result in a thicker skin than another chilled electrode section that is further from the foam material);

(e) changing the dielectric constant of a mold section (mold compounds with a higher dielectric constant will result in less current and a thicker skin than mold compounds with a lower dielectric constant); and (f) any combination of the above.

As demonstrated above in connection with the first and second exemplary embodiments, the method of the present invention may be used to make a molded article from a single foam material placed in a molding cavity of a flow molding apparatus. In particular, a hardened skin may be formed on one or more surfaces (e.g., one or more portions of a top surface, bottom surface, side surface, etc.) of the molded article by reducing the temperature of one or more sections of the molds that are in contact with the foam material. Alternatively, the method may be used to make a molded article from two or more different formable materials (at least one of which is a foam material) placed in a molding cavity of a flow molding apparatus. Again, a hardened skin may be formed on the molded article by reducing the temperature of one or more of the mold sections that are in contact with the foam material.

In view of the foregoing, it should be understood that the method of the present invention enables the fabrication of molded articles with hardened skins that are sufficiently durable to withstand the abrasion that occurs during normal use of the articles. The method may also be used to make molded articles with hardened skins that are easily washable. The method may further be used to fabricate molded articles with hardened skins that may be texturized as desired. In addition, the method may be used to make molded articles with hardened skins that have higher coefficients of friction to thereby provide non-skid surfaces as required for particular applications. Of course, other advantages of the present invention should be apparent to one skilled in the art.

While the present invention has been described and illustrated hereinabove with reference to various exemplary methods, it should be understood that various modifications could be made to this method without departing from the scope of the invention. Therefore, the invention is not to be limited to the exemplary methods described and illustrated hereinabove, except insofar as such limitations are included in the following claims.

What is claimed and desired to be secured by Letters Patent is as follows:

1. A method of making a molded article during a single heating cycle, comprising:

provinding a flow molding apparatus comprising a first mold section and a second mold section;

selecting a foam material from which to form the molded article, wherein the foam material comprises a formable material mixed with a blowing agent;

placing the foam material in the flow molding apparatus such that a first surface of the foam material is in contact with the first mold section and a second surface of the foam material is in contact with the second mold section;

adjusting a characteristic of the second mold section so as to control a thickness of hardened skin to be formed on the second surface of the foam material; and heating the foam material in the flow molding apparatus by applying an alternating electric field across the foam material such that, at the end of the heating cycle, (i) the first surface of the foam material exceeds a decomposition temperature of the blowing agent and is blown and (ii) the second surface of the foam material remains under the decomposition temperature of the blowing agent and is not blown to thereby form the thickness of hardened skin on the second surface of the foam material.

2. The method of claim 1, wherein the thickness of the hardened skin is controlled by changing the thickness of the second mold section, changing the thermal conductivity of the second mold section, adjusting the temperature of an electrode of the flow molding apparatus, utilizing a three-dimensional electrode, changing the dielectric constant of the second mold section, or any combination of the foregoing.

3. The method of claim 1, wherein the flow molding apparatus comprises a third mold section, wherein the foam material is placed in the flow molding apparatus such that a third surface of the foam material is in contact with the third mold section, and wherein the third surface of the foam material remains under the decomposition temperature of the blowing agent and is not blown at the end of the single heating cycle so as to form a thickness of hardened skin on the third surface of the foam material.

4. The method of claim 3, wherein the thickness of hardened skin on the second surface of the foam material is not equal to the thickness of hardened skin on the third surface of the foam material.

5. The method of claim 1, wherein the first and second mold sections comprise a top mold and a bottom mold, respectively, of the flow molding apparatus.

6. The method of claim 1, wherein the first and second mold sections together comprise a top mold or a bottom mold of the flow molding apparatus.

7. A method of making a molded article during a single heating cycle, comprising:
    providing a flow molding apparatus comprising a first mold section and a second mold section;
    selecting a foam material from which to form the molded article, wherein the foam material comprises a formable material mixed with a blowing agent;
    calculating a molding time for the foam material;
    calculating a required power factor for the first mold section based on the calculated molding time of the foam material;
    adjusting the power factor of the first mold section so as to substantially match the required power factor;
    placing the foam material in the flow molding apparatus such that a first surface of the foam material is in contact with the first mold section and a second surface of the foam material is in contact with the second mold section; and
    heating the foam material to form the molded article such that, at the end of the heating cycle, (i) the first surface of the foam material exceeds a decomposition temperature of the blowing agent and is blown and (ii) the second surface of the foam material remains under the decomposition temperature of the blowing agent and is not blown so as to form a thickness of hardened skin on the second surface of the foam material.

8. The method of claim 7, wherein the foam material is heated by applying an alternating electric field across the foam material.

9. The method of claim 7, wherein the thickness of hardened skin is controlled by changing the thickness of the second mold section, changing the thermal conductivity of the second mold section, adjusting the temperature of an electrode of the flow molding apparatus, utilizing a three-dimensional electrode, changing the dielectric constant of the second mold section, or any combination of the foregoing.

10. The method of claim 7, wherein the flow molding apparatus comprises a third mold section, wherein the foam material is placed in the flow molding apparatus such that a third surface of the foam material is in contact with the third mold section, and wherein the third surface of the foam material remains under the decomposition temperature of the blowing agent and is not blown at the end of the single heating cycle so as to form a thickness of hardened skin on the third surface of the foam material.

11. The method of claim 10, wherein the thickness of hardened skin on the second surface of the foam material is not equal to the thickness of hardened skin on the third surface of the foam material.

12. The method of claim 7, wherein the first and second mold sections comprise a top mold and a bottom mold, respectively, of the flow molding apparatus.

13. The method of claim 7, wherein the first and second mold sections together comprise a top mold or a bottom mold of the flow molding apparatus.

* * * * *